United States Patent
Tsukui et al.

(10) Patent No.: US 10,807,196 B2
(45) Date of Patent: Oct. 20, 2020

(54) METHOD FOR MANUFACTURING LASER PROCESSED PRODUCT

(71) Applicant: TOYOTA JIDOSHA KABUSHIKI KAISHA, Toyota-shi, Aichi-ken (JP)

(72) Inventors: Akira Tsukui, Nagoya (JP); Masaki Koike, Nagoya (JP); Junya Shimotamari, Nishio (JP); Hideki Yamauchi, Ogaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 8 days.

(21) Appl. No.: 16/010,885

(22) Filed: Jun. 18, 2018

(65) Prior Publication Data
US 2018/0369963 A1 Dec. 27, 2018

(30) Foreign Application Priority Data
Jun. 21, 2017 (JP) .................................. 2017-121637

(51) Int. Cl.
*B23K 26/352* (2014.01)
*B23K 26/03* (2006.01)
(Continued)

(52) U.S. Cl.
CPC ............ *B23K 26/352* (2015.10); *B23K 26/03* (2013.01); *B23K 26/032* (2013.01);
(Continued)

(58) Field of Classification Search
CPC .... B23K 26/352; B23K 26/032; B23K 26/60; B23K 26/043; B23K 26/21
See application file for complete search history.

(56) References Cited

U.S. PATENT DOCUMENTS 5,877,960 A     3/1999  Gross et al.
6,008,914 A *  12/1999  Sasagawa .......... B23K 26/0604
                                                        359/15
(Continued)

FOREIGN PATENT DOCUMENTS

CN         1154283 A      7/1997
CN       105171239 A     12/2015
(Continued)

OTHER PUBLICATIONS

Machine translation of Japan Patent document No. 10-058,175-A, Nov. 2019.*

(Continued)

*Primary Examiner* — Geoffrey S Evans
(74) *Attorney, Agent, or Firm* — Sughrue Mion, PLLC (57) ABSTRACT

A method for manufacturing a laser processed product including a laser processed part is performed by using a laser oscillation section, a beam splitting section and an imaging section. The manufacturing method includes: forming an irradiation mark including an irradiation pattern in a reference irradiation surface by using the laser oscillation section and the beam splitting section, the irradiation pattern including a plurality of irradiation spots; obtaining an image of the irradiation mark via the imaging section; determining a representative position based on positions of the plurality of irradiation spots in the image; determining a deviation amount of deviation of the representative position from a target position; and forming the laser processed part with a irradiation position corrected based on the deviation amount.

9 Claims, 6 Drawing Sheets

(51) Int. Cl.
*H01M 2/02* (2006.01)
*H01M 2/04* (2006.01)

(52) U.S. Cl.
CPC ....... *H01M 2/0287* (2013.01); *H01M 2/0426* (2013.01); *H01M 2/0434* (2013.01)

(56) References Cited

U.S. PATENT DOCUMENTS

| | | | |
|---|---|---|---|
| 6,610,961 B1 * | 8/2003 | Cheng | B23K 26/04 219/121.71 |
| 2007/0145025 A1 * | 6/2007 | Yamazaki | B23K 26/043 219/121.74 |
| 2012/0055909 A1 | 3/2012 | Miyake et al. | |
| 2014/0204398 A1 * | 7/2014 | Sato | F21S 41/143 356/614 |
| 2015/0360320 A1 | 12/2015 | Yoshida et al. | |
| 2017/0028507 A1 | 2/2017 | Tsukui | |
| 2019/0005669 A1 * | 1/2019 | Jiang | G01C 21/005 |

FOREIGN PATENT DOCUMENTS

| | | | | |
|---|---|---|---|---|
| CN | 106392305 A | | 2/2017 | |
| JP | 8-318385 A | | 12/1996 | |
| JP | 10058175 A | * | 3/1998 | |
| JP | 2004-276101 A | | 10/2004 | |
| JP | 2008241255 A | * | 10/2008 | ............. H01M 4/38 |
| JP | 2012-148302 A | | 8/2012 | |
| JP | 2013125915 A | * | 6/2013 | |
| JP | 2016-002562 A | | 1/2016 | |
| JP | 2017030010 A | * | 2/2017 | ........... B23K 26/323 |
| JP | 2017-104883 A | | 6/2017 | |
| KR | 10-2012-0009510 A | | 2/2012 | |
| WO | 2010/131298 A1 | | 11/2010 | |

OTHER PUBLICATIONS

Machine translation of Japan Patent document No. 2008-241,255-A, Nov. 2019.*
Machine translation of Japan Patent document No. 2013-125,915-A, Nov. 2019.*

* cited by examiner

METHOD FOR MANUFACTURING LASER PROCESSED PRODUCT

INCORPORATION BY REFERENCE

The disclosure of Japanese Patent Application No. 2017-121637 filed on Jun. 21, 2017 including the specification, drawings and abstract is incorporated herein by reference in its entirety.

BACKGROUND

1. Technical Field

The present disclosure relates to a method for manufacturing a laser processed product including a laser processed part, and a laser processed product.

2. Description of Related Art

Conventionally, laser welding for joining two members to each other via laser light irradiation has been taking place. In laser welding, it is necessary to provide laser light irradiation targeted for a position of joining between two members. This is because low precision of a laser light irradiation position is highly likely to cause poor welding. Examples of a technique for correcting a laser light irradiation position for such reason include Japanese Patent Application Publication No. 2004-276101 (JP 2004-276101 A). In other words, in the laser processing method in JP 2004-276101 A, an actual measurement value is obtained by picking up an image of a laser light irradiation position via an imaging device. Then, a correction value for correcting an offset distance between the imaging device and a laser head and a correction value for correcting a distortion of an fθ lens are calculated.

SUMMARY

However, the above-stated conventional technique has the following problem. An irradiation mark formed at a laser light irradiation position is not a point but an area having a certain degree of breadth. Therefore, it is necessary to identify the center of the irradiation position. However, the shape of the irradiation mark is not necessarily a perfect circle and is sometimes distorted. This is because the laser light energy distribution itself is not necessarily symmetrical about the center. Furthermore, the shape of the irradiation mark is also affected by a property of the irradiation target surface. In a condition in which a distorted irradiation mark would be formed, the center of an irradiation position cannot precisely be identified. Therefore, an increase in precision of correction of the irradiation position may fail.

The present disclosure provides a method for manufacturing a laser processed product, the method enabling performing laser processing with an irradiation position corrected with high precision even in a condition in which a distorted irradiation mark would be formed at a laser light irradiation position. Also, the present disclosure provides a laser processed product.

A first aspect of the present disclosure provides a method for manufacturing a laser processed product including a laser processed part, in which a laser oscillation section that emits laser light for irradiation toward a processing object, a beam splitting section that splits the laser light from the laser oscillation section to form an irradiation pattern in an irradiation target surface of the processing object, the irradiation pattern including a plurality of irradiation spots not arranged in a straight line, the irradiation pattern including a representative position coinciding with a direct irradiation position for a case where the laser light from the laser oscillation section is provided without being split, and an imaging section that obtains an image of an area including a laser processing target position in the irradiation target surface are used. The method for manufacturing a laser processed product includes: forming an irradiation mark including the irradiation pattern in a reference irradiation surface using the laser oscillation section and the beam splitting section; obtaining an image of the irradiation mark via the imaging section; determining a representative position in the irradiation pattern based on positions of the plurality of irradiation spots, in the image: determining a deviation amount of deviation of the representative position from the target position in the image; and forming the laser processed part by irradiating the processing object with the laser light from the laser oscillation section with an irradiation position in the irradiation target surface corrected based on the determined deviation amount, the position being irradiated with the laser light from the laser oscillation section.

In the method for manufacturing a laser processed product according to the first aspect, a processing object is processed by irradiating the processing object with laser light from the laser oscillation section, and a laser processed product is thus manufactured (processing step). A part irradiated with the laser light in the processing object becomes a laser processed part. Here, in the first aspect, prior to the processing step, an amount of deviation of a laser light irradiation position from a processing target position is identified. This is intended to correctly perform processing by performing the processing step with the deviation corrected. The deviation amount to be identified is a vector amount.

For identification of the deviation amount, first, an irradiation mark is formed by irradiating a reference irradiation surface with laser light. At this time, use of the beam splitting section allows the irradiation mark to be formed, to have a predetermined irradiation pattern including a plurality of irradiation spots (pattern forming step). Then, an image of the formed irradiation mark is obtained via the imaging section. The irradiation pattern formed by the irradiation mark in the obtained image includes a plurality of irradiation spots. Therefore, a representative position in the irradiation pattern can be determined based on positions of the irradiation spots (representative position determination step). The determined representative position is a position coinciding with a direct irradiation position for the laser light from the laser oscillation section. However, the position is a position determined through patterning via the beam splitting section and thus has a small error relative to a position obtained by forming a welding mark at the direct irradiation position only and thus is highly precise. Even if a roundness of each irradiation spot is low, such low roundness does not matter much. The deviation amount is determined by comparing the representative position thus determined with a position determined as a laser processing target position in the image.

The processing step is performed with the irradiation position corrected based on the deviation amount. In the processing step, the processing object can be irradiated with the laser light without using the beam splitting section or the processing object can be irradiated with the laser light using the beam splitting section. Also, where the processing is welding, the processing object is formed of a first object and a second object, and a part of abutment between the first and second objects becomes the laser processed part (welded part).

In the first aspect, a spot corresponding to the direct irradiation position may be included in the irradiation spots in the irradiation pattern. In this case, the representative position determined as stated above is a position obtained by correcting the direct irradiation position based on irradiation spots other than the direct irradiation spot. Irradiation spots other than the direct irradiation spot being taken into consideration to determine the representative position as above enhances the positional precision.

In the first aspect, for determining the representative position, a first representative line may be determined based on two or more positions of the plurality of irradiation spots, and a second representative line that is not parallel to the first representative line may be determined based on other two or more irradiation spots of the plurality of irradiation spots, and a position of intersection between the first representative line and the second representative line may be determined as the representative position. In this case, as a matter of course, an irradiation spot group for determining the first representative line and an irradiation spot group for determining the second representative line are different irradiation spot groups. However, the direct irradiation spot may be included in both groups. Here, the direct irradiation spot does not necessarily need to be used for determination of the first and second representative lines.

In the first aspect, as the beam splitting section, a diffraction optical element that diffracts the laser light from the laser oscillation section may be used. This is because the elimination of the need for mechanical scanning of the irradiation position enables further enhancement in positional accuracy of each irradiation spot and thus enables higher-precision determination of the representative position. This is also because a zero-order spot at a position that is the same as the direct irradiation position is included in the irradiation pattern.

In the first aspect, as the reference irradiation surface, a surface of the processing object, the surface including a part to be processed may be used. Consequently, determination of the deviation amount and performance of processing take place on the same surface of the processing object and thus, higher correction accuracy can be expected during processing. This is because the deviation amount is the same between the time of determination of the deviation amount and the time of performance of processing.

In the first aspect, forming the irradiation mark may be performed for a rough area within a recommended range in which a surface roughness is determined in advance, in the reference irradiation surface. A smooth area having a small surface roughness has high laser light reflectivity. Therefore, energy of laser light necessary for forming an irradiation mark is high. On the other hand, in the case of an area having an excessively large surface roughness, a range that is proper for energy of laser light for forming an irradiation mark is limited to a narrow range on the low energy side. Forming an irradiation mark in an irradiation mark having a surface roughness in the recommended range provide the advantage of a proper energy range for the laser light being wide.

In the first aspect, the recommended range may be 0.2 µm to 0.25 µm.

Therefore, the rough area may be formed within the reference irradiation surface by roughening a surface of the processing object, before the forming the irradiation mark. Consequently, even if the reference irradiation surface originally includes no proper rough area, the irradiation mark can properly be formed to determine the deviation amount.

In the first aspect, the processing object may include a first outer covering member and a second outer covering member for a battery, and the laser processed product may be a battery including the first outer covering member and the second outer covering member welded to each other via laser processing, the battery incorporating a power generation element inside. The first aspect enables manufacture of a highly reliable battery in which the first outer covering member and the second outer covering member are properly welded to each other.

Also, a laser processed product according to a second aspect of the present disclosure, which includes a laser processed part, includes a first laser irradiation mark in the laser processed part and a second laser irradiation mark located in a part of the laser processed part, the part being not a part in which the first laser irradiation mark is located. The second laser irradiation mark has an irradiation pattern including a plurality of irradiation spots not arranged in a straight line. The presence of the second laser irradiation mark enables determining the relevant laser processed product as one manufactured by the laser processed product manufacturing method according to the above-described first aspect.

The present configuration provides a method for manufacturing a laser processed product, the method enabling performing laser processing with a laser light irradiation position corrected with high precision even in a condition in which a distorted irradiation mark would be formed at the irradiation position. Also, the present configuration provides the laser processed product.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
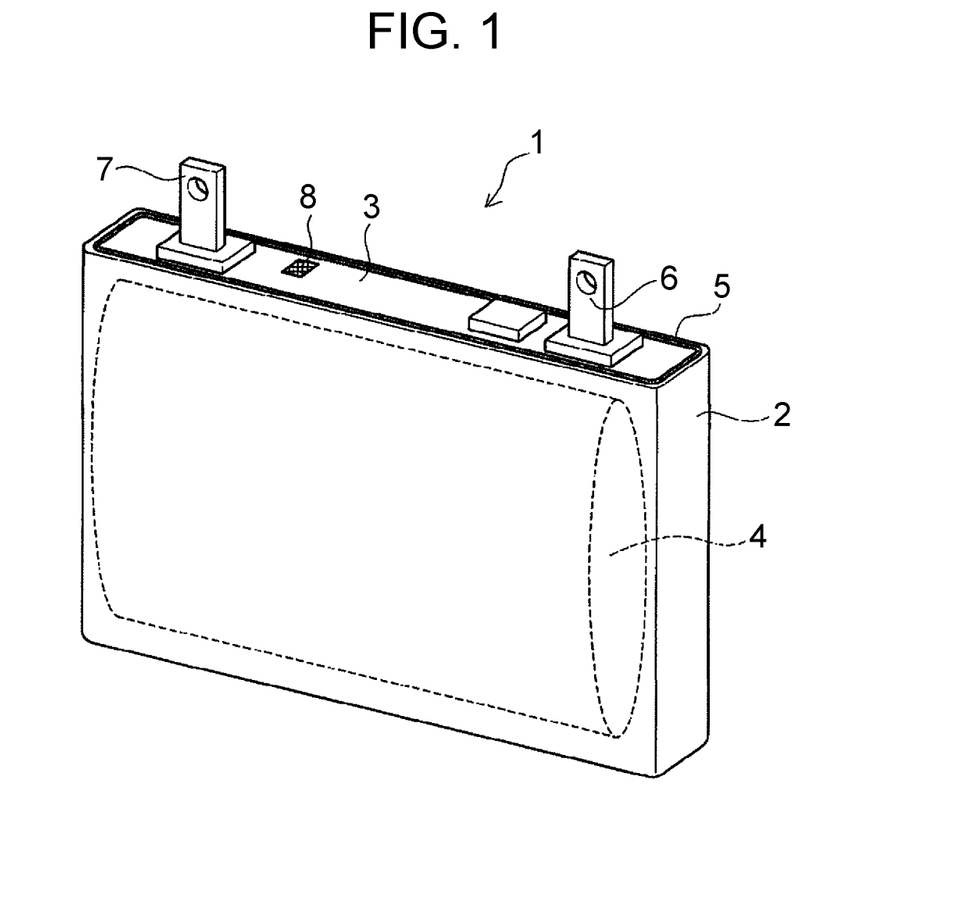
FIG. 1 is a perspective view illustrating a battery manufactured via laser welding.

An embodiment of the present disclosure will be described in detail below with the accompanying drawings. The present embodiment is one that embodies the present disclosure as a method for manufacturing a battery 1, which is illustrated in FIG. 1. The battery 1, which is of a flat rectangular shape, has an outer shape formed by a case body 2 and a cover member 3. Inside the battery 1, a power generation element 4 is incorporated. The case body 2 and the cover member 3 are welded to each other via a welding mark 5 that extends over an entire periphery thereof. The welding mark 5 is one formed by laser welding. Also, positive and negative electrode terminals 6, 7 are provided so as to extend through the cover member 3. Furthermore, a rough area 8 is formed in a part of an outer surface of the cover member 3. The rough area 8 will be described later.

Figure 2:
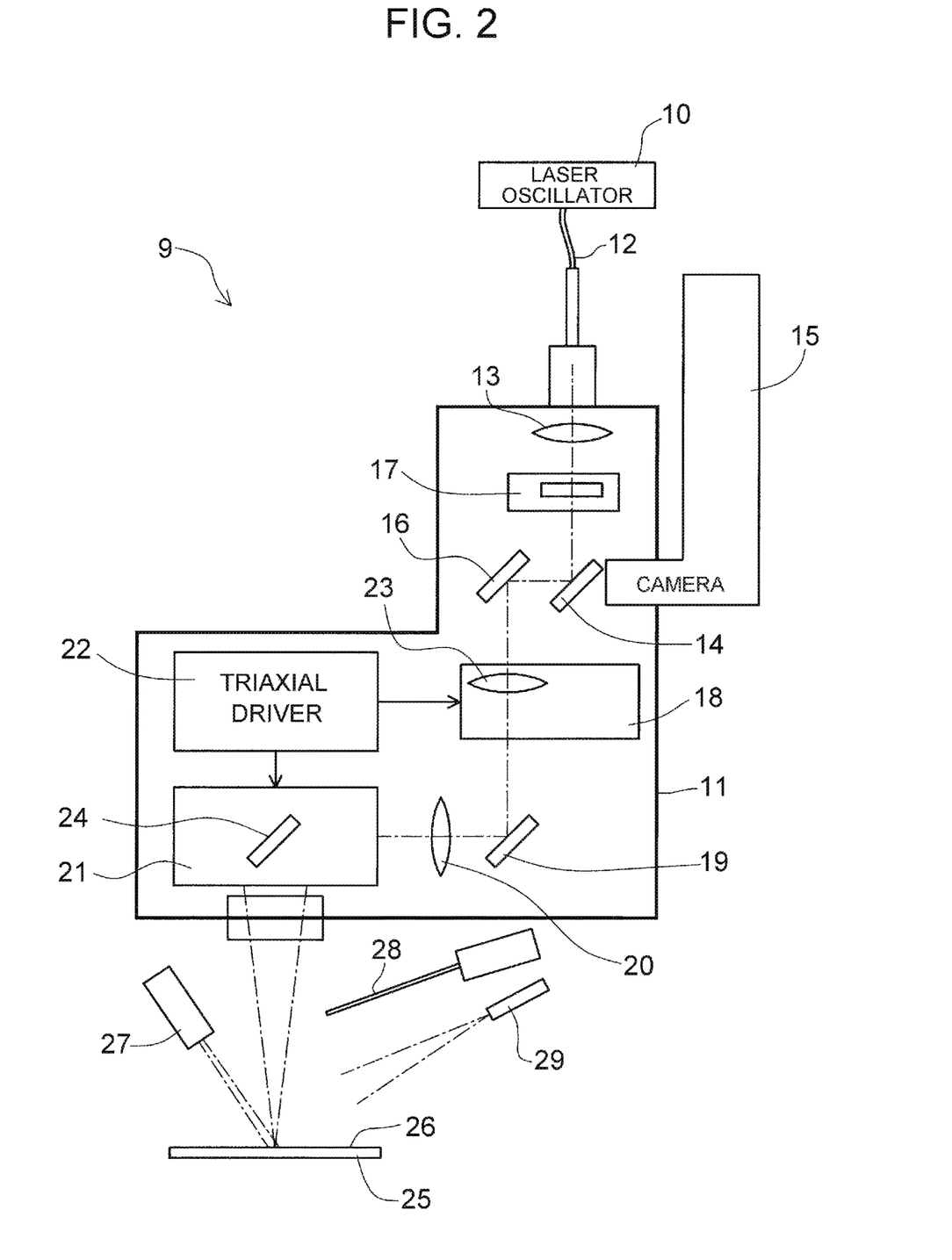
FIG. 2 is a sectional view illustrating a configuration of a laser welding apparatus.

A configuration of a laser welding apparatus 9 for welding the case body 2 and the cover member 3 above to each other will be described with reference to FIG. 2. The laser welding apparatus 9 illustrated in FIG. 2 includes a laser oscillator 10 and a head unit 11. The laser oscillator 10 and the head unit 11 are connected via a fiber cable 12. The head unit 11 is configured to irradiate an irradiation target surface 26 of a workpiece 25 set below with laser light emitted from the laser oscillator 10. The laser light from the head unit 11, the laser light irradiating the workpiece 25, has a capability of locally melting the workpiece 25. In addition to such capability, the head unit 11 also has a function that images the irradiation target surface 26.

In the head unit 11, a collimator lens 13, a diffraction optical element 17, a dichroic mirror 14, a coaxial camera 15, a reflective mirror 16, a Z-direction lens drive unit 18, a reflective mirror 19, a condenser lens 20, an X-Y scanner unit 21, and a triaxial driver 22 are provided. From among these components, in the Z-direction lens drive unit 18, a Z-direction lens 23 is incorporated. Also, in the X-Y scanner unit 21, a galvanometer mirror 24 is incorporated.

The collimator lens 13 is a lens that collimates laser light emitted from the laser oscillator 10. The diffraction optical element 17 is configured to split laser light from the laser oscillator 10 to form an irradiation pattern including a plurality of irradiation spots in the irradiation target surface 26. Details of the irradiation pattern will be described later. The diffraction optical element 17 can enter a state in which the diffraction optical element 17 is disposed on an optical path of laser light and a state in which the diffraction optical element 17 is retracted from the optical path. The diffraction optical element 17 illustrated in FIG. 2 is in the state in which the diffraction optical element 17 is disposed on the optical path of the laser light.

The dichroic mirror 14 is an optical element that reflects light in a particular wavelength range only and transmits light of wavelengths out of that range. The dichroic mirror 14 in the present embodiment is configured to reflect laser light emitted from the laser oscillator 10 and transmits light other than the laser light. Consequently, the irradiation target surface 26 can be observed and imaged by the coaxial camera 15 while laser light from the laser oscillator 10 is provided for irradiation of the irradiation target surface 26.

The Z-direction lens drive unit 18 is configured to focus laser light on the irradiation target surface 26 by upward/downward movement of the Z-direction lens 23. The X-Y scanner unit 21 is configured to adjust a position of irradiation with laser light in the irradiation target surface 26, by driving the galvanometer mirror 24. Each of the Z-direction lens drive unit 18 and the X-Y scanner unit 21 is controlled by the triaxial driver 22.

In the laser welding apparatus 9, a laser pointer 27, a protection glass plate 28, and an air nozzle 29 are further provided. The laser pointer 27 is configured to irradiate the irradiation target surface 26 with a laser beam that is different from laser light from the head unit 11. The laser beam from the laser pointer 27 has no capability of melting the workpiece 25 and is configured to form a bright spot within an image of the irradiation target surface 26 observed and picked up by the coaxial camera 15. The laser welding apparatus 9 is adjusted so that a position of the bright spot becomes a target position of welding via laser light from the head unit 11. The protection glass plate 28 is configured to prevent laser light from becoming stray light as a result of the laser light deviating from the workpiece 25. The air nozzle 29 is configured to blow off foreign substances on the irradiation target surface 26.

Welding via the above-described laser welding apparatus 9 is performed as follows. First, at the time of welding, the diffraction optical element 17 is brought into the state in which the diffraction optical element 17 is retracted from the optical path of laser light. Thus, the irradiation target surface 26 of the workpiece 25 is irradiated with direct laser light emitted from the laser oscillator 10 and not subjected to beam splitting by the diffraction optical element 17. Consequently, the above-described target position in the irradiation target surface 26 is locally melted. Therefore, where the workpiece 25 is formed of two members, a part of abutment between the two members is placed at the target position, and is irradiated with laser light in such state, whereby the two members is welded to each other.

Here, welding may be performed in a state in which the diffraction optical element 17 runs out on the optical path of laser light. This is because with the diffraction optical element 17, a plurality of irradiation spots generated include one located at a position that is the same as a position of direct laser light (zero-order light). Welding using the diffraction optical element 17 enables a space between the members to be reliably closed using later-described diffracted light as a secondary heat source while securing a weld penetration depth using direct laser light (later-described zero-order light) using a primary heat source.

In the case of the battery 1, the part of a boundary between the case body 2 and the cover member 3 may be placed at the target position, and while the target position being irradiated with laser light, the battery 1 may be moved so as to cause the target position to make a circuit of a peripheral edge of the cover member 3. Consequently, the welding mark 5 is formed, and the battery 1 is thus manufactured. Here, it should be understood that the power generation element 4 is put in the case body 2 prior to the welding.

In the above description, it has been assumed that an irradiation position, in the irradiation target surface 26, irradiated with direct laser light from the laser oscillator 10 and the above-described target position match up precisely with each other as intended. However, in reality, there may be a certain degree of deviation between these positions. If there is such deviation, even though laser light irradiation is performed in such a manner as described above, proper welding cannot be achieved. Therefore, in the present embodiment, a direction and an amount of the deviation are identified using the diffraction optical element 17 and welding is performed with the deviation corrected.

Figure 3:
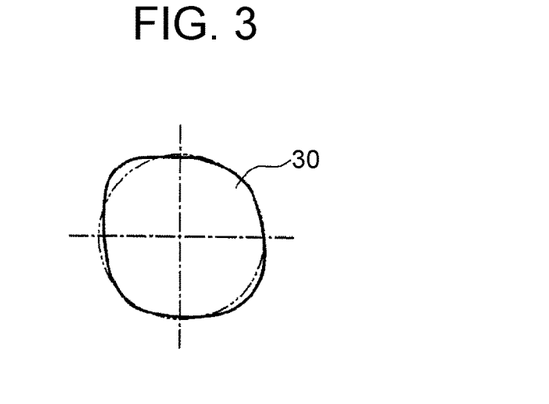
FIG. 3 is a plan view illustrating an example of a shape of an irradiation mark formed without using a diffraction optical element.

The deviation amount (vector amount) can simply be identified by irradiating the irradiation target surface 26 with direct laser light with the workpiece 25 fixed. In other words, the direction of the deviation from the target position and the amount of the deviation may be determined in an image by observing a generated spot-like irradiation mark in the image via the coaxial camera 15. As described above, the target position can be recognized as a bright point in the image, the bright point being provided by a laser beam from the laser pointer 27. However, as stated in the above, that is not enough to determine the center position of the irradiation mark with good precision. This is because an irradiation mark 30 may be a spot having a distorted shape that is not a perfect circle as illustrated in FIG. 3.

Therefore, in the present embodiment, the deviation amount is identified with higher precision by using the diffraction optical element 17. The diffraction optical element 17 is an optical component having a known grid pattern, and is configured to split laser light from the laser oscillator 10 into a plurality of laser light beams. Therefore, if an irradiation mark is formed on the irradiation target surface 26 with the diffraction optical element 17 inserted on the optical path (FIG. 2), as illustrated in FIG. 4, a patterned irradiation mark 31 formed of a plurality of spots is formed.

Figure 4:
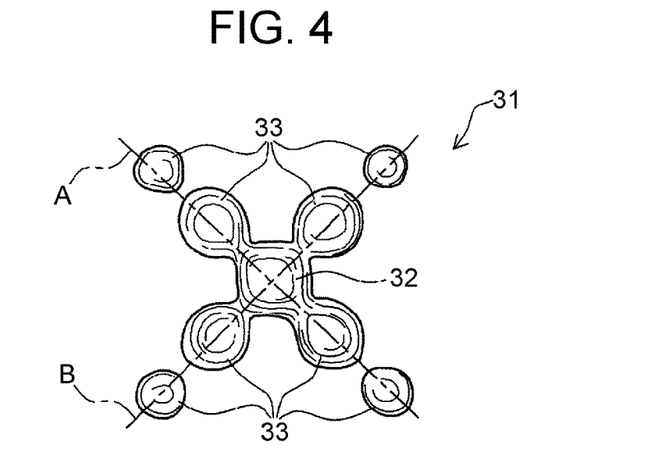
FIG. 4 is a plan view illustrating an example of a patterned irradiation mark formed using a diffraction optical element.
Figure 5:
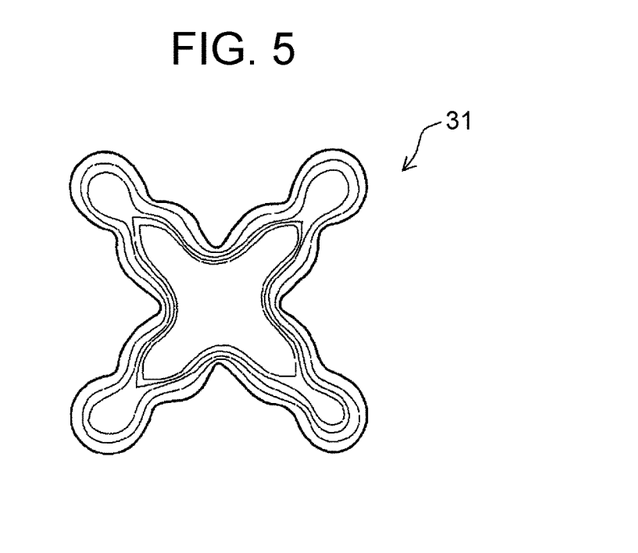
FIG. 5 is a plan view illustrating an example of an irradiation mark where irradiation energy is large.

The patterned irradiation mark 31 in FIG. 4 is formed of a zero-order spot 32 at the center and a plurality of diffracted spots 33 around the zero-order spot 32. The zero-order spot 32 is a spot formed by zero-order light travelled straight through the diffraction optical element 17, and is formed at a position that is the same as a position of an irradiation mark 30 (FIG. 3) where no diffraction optical element 17 is used. Each diffracted spot 33 is a spot formed by diffracted light resulting from diffraction via the diffraction optical element 17. An arrangement pattern of the respective spots in the irradiation mark 31 is determined by the grid pattern of the diffraction optical element 17 and a wavelength of laser light of the laser oscillator 10. In other words, if the type of the laser oscillator 10 and the grid pattern of the diffraction optical element 17 are determined, the arrangement pattern of the irradiation mark 31 is constant. However, as illustrated in FIG. 5, depending on the irradiation energy, the respective spots in the irradiation mark 31 may be connected.

In the patterned irradiation mark 31 in FIG. 4, each of the spots 32, 33 has the center position thereof. There are several known methods for determining the center position of each spot 32, 33, and any of such methods may be employed. Examples of the methods include, e.g., a method in which a center position of each spot where the spot is regarded as a figure, a method in which the center position is determined from an approximate image for each spot and a method in which a circle is put on each spot by Hough transform and the center position of the circle is used.

Then, an average position of these center positions can be obtained. This average position of a representative position for the entire patterned irradiation mark 31, and is a position that coincides with the true center position of an irradiation mark 30 (FIG. 3) formed without using the diffraction optical element 17. Therefore, a direction and an amount of deviation of the representative position from the target position may be determined in an image. Even in the case where the irradiation mark 31 has a continuous shape such as in FIG. 5, the center position of each spot 32, 33 can be determined by identifying the center position on a screen.

As a matter of course, even if the above-described method of the present embodiment is used, the center position of each spot 32, 33 has a problem in precision because of a reason similar to that of the case illustrated in FIG. 3. However, employment of the representative position of the center positions of the plurality of spots 32, 33 reduces an error in position of each spot 32, 33. Therefore, in comparison with the case where a deviation amount is identified from only one spot formed by direct laser light such as in FIG. 3, in the present embodiment, a deviation amount can be identified with much higher precision. Even the case in FIG. 5, which is relatively inferior in precision to the case of FIG. 4, but still enables identification of a deviation amount with higher precision compared to the case in FIG. 3.

In the above, the description has been provided on obtaining the representative position of the irradiation mark 31 as the average position of the center positions of the respective spots 32, 33. For an average position of the respective center positions, an average of coordinate values of the respective center positions may be obtained for each of an X-coordinate and a Y-coordinate. Furthermore, not only simply averaging but also weighted averaging may be used. Weighting in such case may be, for example, weighting a spot farther from the zero-order spot 32 more. Also, since distribution of energy among the plurality of divisional laser light beams is known, a spot with larger energy can be weighted more. Conversely, a spot with larger energy can be weighted less.

Alternatively, instead of obtaining an average position, it is possible to determine representative lines A, B indicated in FIG. 4 based on the center positions of the respective spots 32, 33 and set a point of intersection between representative lines A and B as a representative position. Each of representative lines A, B is a line determined based on the center positions of a plurality of spots included in the spots 32, 33. The plurality of spots for determining representative line A and the plurality of spots for determining representative line B are different spot groups. However, the zero-order spot 32 may be included in both groups. Also, representative line A and representative line B are non-parallel to each other. More specifically, representative lines A, B may be determined by means of a least-squares method based on the center positions of the spots on the respective representative lines. Also, regardless of whether the average position or the representative lines are used, the position of the zero-order spot 32 may be excluded from the determination of the representative position. In particular, where the irradiation mark 31 has a continuous shape such as in FIG. 5, it is preferable to determine the representative position with the position of the zero-order spot 32 excluded.

After the deviation amount being identified with good precision in such a manner as described above, welding may be performed with the deviation amount corrected. For the correction of the deviation amount, there is a method in which a target position itself is corrected and a method in which a workpiece 25 is set at a position obtained by back calculation for the deviation amount from the target position, and either of the methods may be employed. As a result of irradiation with laser light from the head unit 11 with the correction for the deviation amount made as described above, laser light can be applied precisely to the part of the boundary between the case body 2 and the cover member 3. Consequently, welding can properly be performed.

Here, in observing and imaging an irradiation mark 31 formed in the irradiation target surface 26, such as illustrated in FIG. 4, via the coaxial camera 15, there is the problem of original smoothness of the irradiation target surface 26. If the smoothness of the irradiation target surface 26 is excessively high, an irradiation mark 31 is not easily formed. Since a smooth surface has high laser light reflectivity, only a small part of input energy contributes to formation of an irradiation mark 31. Therefore, laser light for irradiation needs to have quite high energy.

Figure 6:
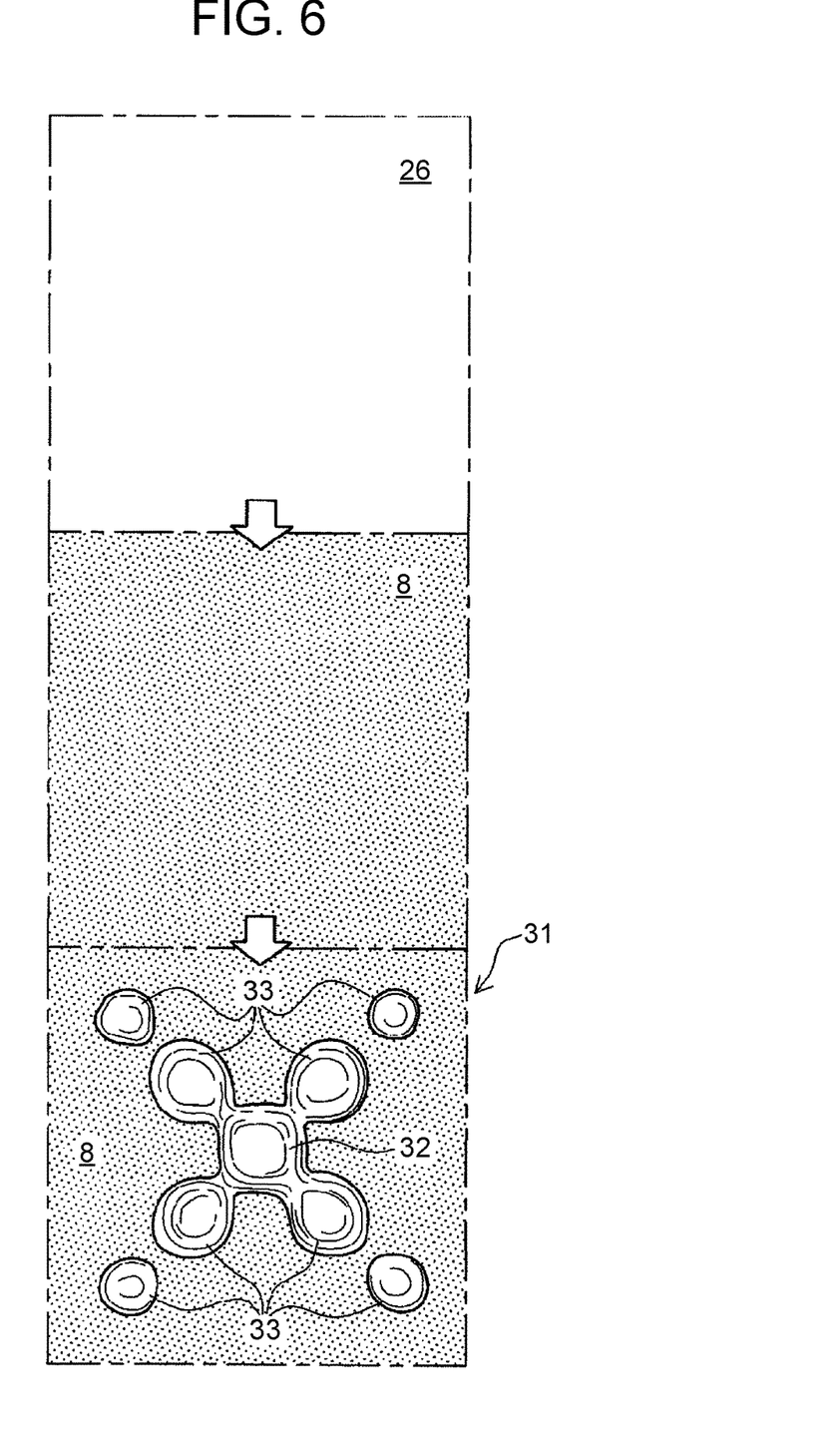
FIG. 6 is a plan view illustrating irradiation target surfaces before and after roughening and an irradiation mark formed.

Thus, prior to laser light irradiation for formation of an irradiation mark 31, it is desirable to perform a roughening step of roughening the irradiation target surface 26. In other words, as illustrated in FIG. 6, the irradiation target surface 26 (upper part) is first roughened to form the rough area 8 (middle part). Within this rough area 8, an irradiation mark 31 is formed (lower part). As a result of the roughening step being performed in such a manner as described above, an irradiation mark 31 can stably be formed with no need for laser light for irradiation to have particularly high energy. This is because the rough area 8 has low laser light reflectivity and a majority of input energy effectively contributes to formation of the irradiation mark 31. Furthermore, forming the irradiation mark 31 within the rough area 8 also provides the advantage of a boundary between the inside and the outside of the irradiation mark 31 being easily and clearly recognized in an image observed via the coaxial camera 15. This is because a clear difference in brightness between the inside and the outside of the irradiation mark 31 appears in the image.

Therefore, in comparison with the case where an irradiation mark 31 is performed with no roughening step performed, the center positions of the respective spots 32, 33 can be determined with even higher precision. Here, the rough area 8 does not need to be formed the entire irradiation target surface 26, and it is sufficient that the rough area 8 is formed in an area including an entire area in which a patterned irradiation mark 31 is to be formed. Also, if the irradiation target surface 26 is originally adequately rough, an irradiation mark 31 may be formed sufficiently clearly even with no roughening step performed.

Examples of a specific method of roughening include scanning a laser light ray on the irradiation target surface 26. A laser beam of the laser pointer 27 may be used with an output thereof increased to be higher than that for forming a bright point, or a laser beam of the laser oscillator 10 may be used with an output thereof decreased to be lower than that for welding or forming an irradiation mark 31. Alternatively, roughening may be performed via mechanical polishing or chemical etching.

Figure 7:
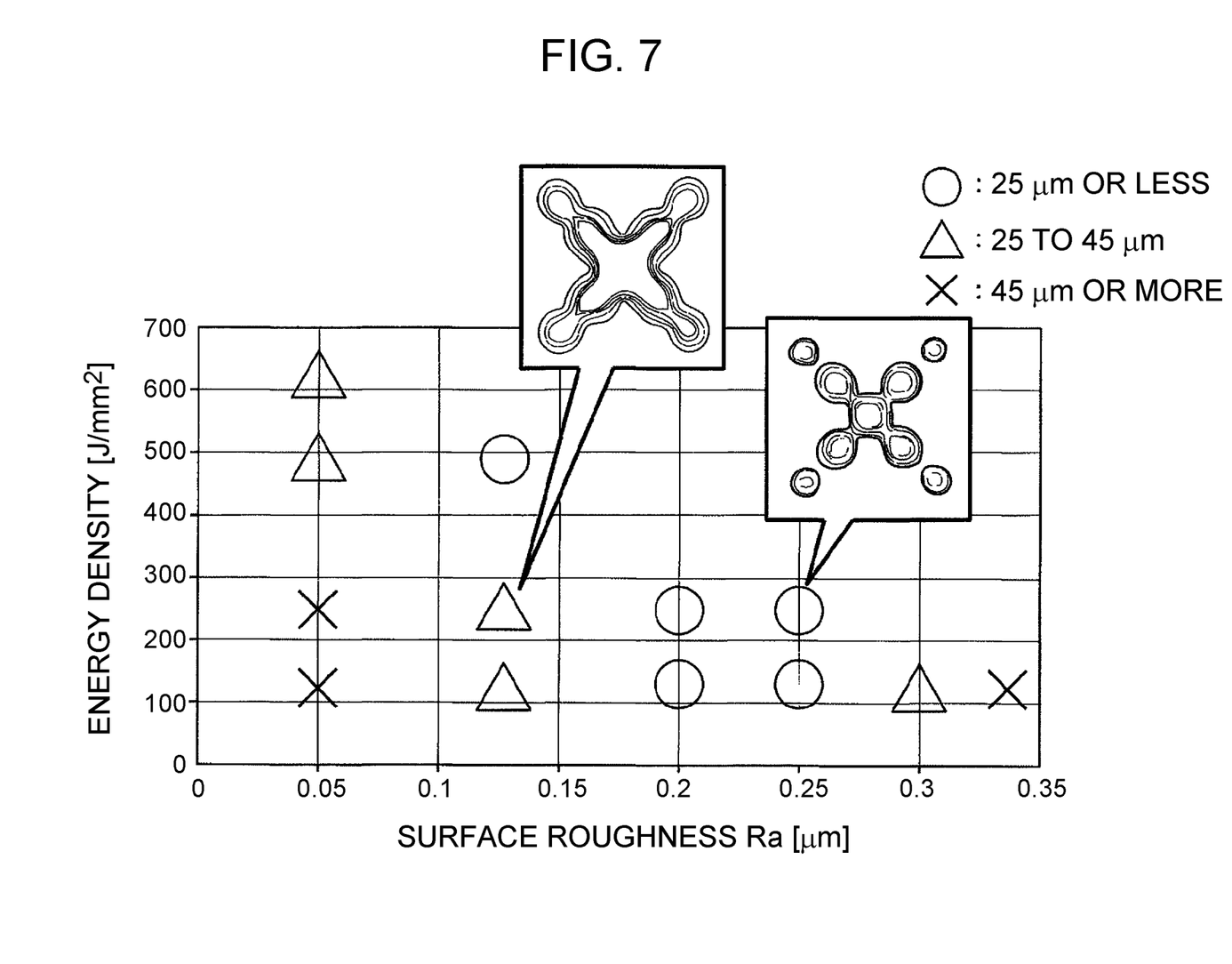
FIG. 7 is a graph indicating a reproduction precision of an irradiation mark forming position for each surface roughness and each energy density.

Next, results of tests performed with regard to effects of roughening will be described. FIG. 7 illustrates reproduction precisions of forming positions when a multitude of irradiation marks 31 are formed, for each surface roughness Ra of the rough area 8 after roughening and each energy density of the laser beam. Here, the energy density of the laser beam is not that for a laser beam used in the roughening step, but the energy density of the laser beam for forming an irradiation mark 31. In FIG. 7, the abscissa axis represents surface roughness Ra [m], and the ordinate axis represents energy density [J/mm$^2$] of the laser beam.

The figures plotted in FIG. 7 each indicate a degree of reproducibility of a forming position when an irradiation mark 31 is formed with the relevant surface roughness and the relevant energy density. More specifically, each of the degrees is ranked as "○", which indicates 25 μm or less, "Δ", which indicates 25 to 45 μm, or "x", which indicates 45 μm or more, according to standard deviation of coordinate values of positions of the multitude of irradiation marks 31 formed.

Referring to FIG. 7, while in the right-side part in the graph in which the surface roughness is large, tests were conducted under a condition that the energy density is not so high, in the left-side part in the graph in which the surface roughness is small, tests were conducted under respective conditions ranging from a condition that the energy density is low to a condition that the energy density is high. This is because, as described above, an irradiation mark 31 can be formed on a rough surface even with a laser beam of low energy, but a clear irradiation mark 31 cannot easily be formed on a smooth surface unless a laser beam of high energy is used.

In FIG. 7, furthermore, within a surface roughness Ra range of 0.1 to 0.3 μm, only results of "○" or "Δ" are indicated. In particular, within a surface roughness Ra range of 0.2 to 0.25 μm, only results of "○" are indicated. Therefore, these ranges are ranges recommended for the surface roughness Ra of the rough area 8.

For example, under the condition that the surface roughness Ra is 0.25 μm and the energy density is approximately 250 J/mm$^2$, an irradiation mark 31 such as illustrated in FIG. 4 in which respective spots can clearly be recognized individually was formed, and variation of the center positions of the respective spots was 25 μm or less. Also, under the condition that the surface roughness Ra is approximately 0.13 μm and the energy density is approximately 250 J/mm$^2$, an irradiation mark 31 such as illustrated in FIG. 5 was formed. In the irradiation mark 31, spots were connected, but the center position of each spot could be at least determined, and variation of the center positions of the respective spots was within a range of 25 to 45 μm. Under the condition that the surface roughness Ra is approximately 0.13 μm, also, variation of the center positions of respective spots was 25 μm or less when the energy density was increased to around approximately 500 J/mm$^2$.

On the other hand, under a condition that the surface roughness Ra is high and exceeds approximately 0.3 μm, even with a low energy density of approximately 130 J/mm$^2$, a sufficient irradiation mark 31 was not formed because of excessive melting. Even with visual identification of the center position of each spot, variation of the center positions exceeded 45 μm. However, even under such roughness condition, variation of the center positions of the respective spots can be made to 45 μm or less if the energy density is further decreased.

Also, under the condition that the surface roughness Ra is 0.05 μm and thus low and the energy density is approximately 250 J/mm$^2$ or less, a sufficient irradiation mark 31 was not formed because of insufficient weld penetration. With visual identification of the center position of each spot, variation of the center positions exceeded 45 μm. However, even under such roughness condition, variation of the center positions of the respective spots fell to 45 μm or less when the energy density was increased to approximately around 500 J/mm$^2$ or more. Therefore, even though the surface roughness Ra of the rough area 8 is out of the aforementioned recommended ranges, such rough area 8 is not totally unusable.

Figure 8:
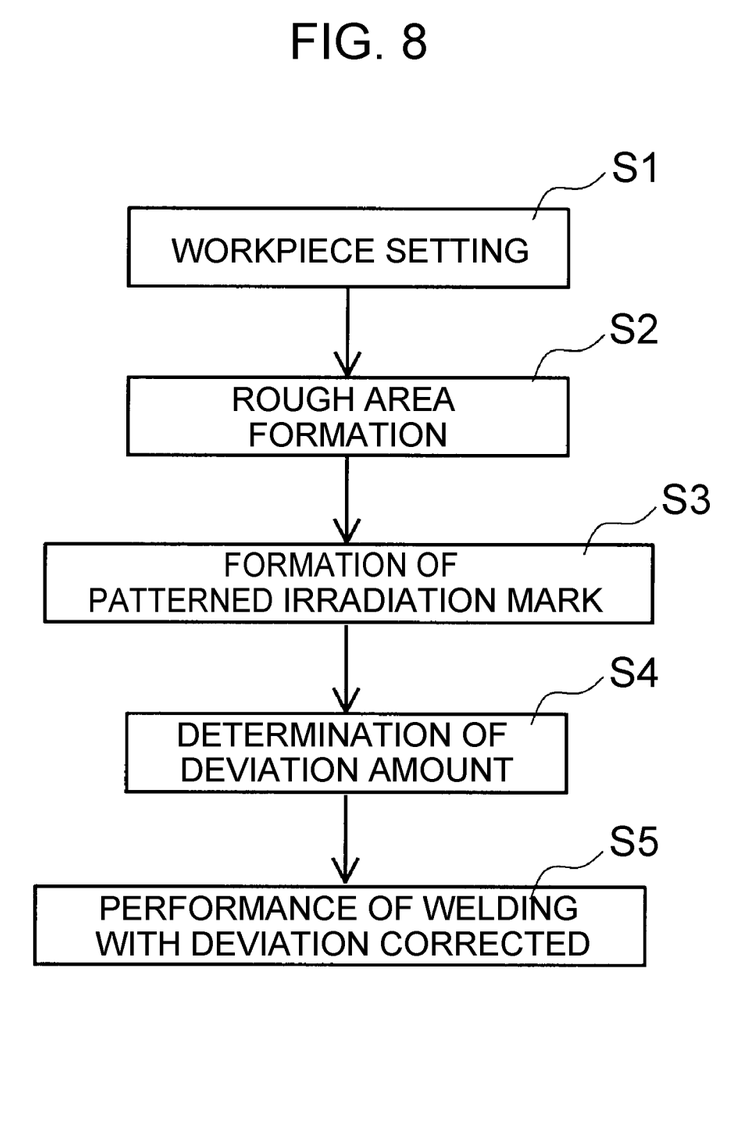
FIG. 8 is a flowchart illustrating a battery manufacturing procedure according to a method according to an embodiment.

According to the above, manufacture of the battery 1 in FIG. 1 by the laser welding apparatus 9 according to the present embodiment, that is, welding between the case body 2 and the cover member 3, is performed according to the procedure in FIG. 8. In other words, a workpiece 25 (a case body 2 and a cover member 3) is set at an irradiation target position (S1), and first, a rough area 8 is formed through the roughening step (S2). In the example illustrated in FIG. 1, the rough area 8 is formed at a position in an upper surface of the cover member 3, the position not overlapping a welding mark 5. In reality, the rough area 8 is formed prior to the welding mark 5.

Then, a patterned irradiation mark 31 is formed within the rough area 8 (S3). Although illustrated not so precisely in FIG. 1, in reality, an irradiation mark 31 is also formed within the rough area 8 in the battery 1 illustrated in FIG. 1. Then, a deviation amount is determined (S4). As described above, the deviation amount is determined by observation and imaging of an irradiation mark 31 via the coaxial camera 15, determination of a representative position of the irradiation mark 31 and identification of a deviation amount (vector amount) via comparison between the representative position and a target position (bright point provided by the laser pointer 27). Then, welding is performed with the deviation corrected (S5). Consequently, a welding mark 5 is formed.

In the above description of the procedure in FIG. 8, the formation of the rough area 8 in step S2 is performed for the upper surface of the cover member 3. This means that the patterned irradiation mark 31 is formed at a part that is level with a welding target part. Therefore, there is almost no difference in amount of deviation of an irradiation position from a target position between the time of formation of the irradiation mark 31 and the time of performance of welding. Therefore, the accuracy for correction of deviation is higher. Here, depending on the original surface roughness of the upper surface of the cover member 3, the step in S2 may be omitted.

Also, the steps in S2 to S4 in the procedure in FIG. 8 may be performed for all of individual batteries 1 to be subjected to welding or may be performed for a representative one only. In the latter case, based on a deviation amount obtained for the representative one, the other ones are subjected to correction and welding in a manner that is similar to those of the representative one. Here, e.g., immediately after a start of the laser welding apparatus 9 from a stop state or after a large change in air temperature or other environmental factor, it is desirable to perform the steps in S2 to S4 without fail. This is because the deviation amount possibly varies.

As described in detail above, with the present embodiment, when two members are to be welded to each other by the laser welding apparatus 9, a deviation of a welding position, that is, a laser light irradiation position for welding, from a target position is corrected. An amount of the deviation is identified by forming a patterned irradiation mark 31 such as illustrated in FIG. 4, rather than a single spot. Consequently, in comparison with the case where a deviation amount is identified based on a single spot, a deviation amount can be identified with higher precision. Therefore, an intended position can correctly be irradiated with laser light and thus proper welding can be performed.

Also, desirably, prior to forming the irradiation mark 31, a rough area 8 is formed in an irradiation target surface 26. Thus, the patterned irradiation mark 31 is formed within the rough area 8, a laser light reflectivity of which is not so high. Therefore, the patterned irradiation mark 31 can properly be formed without the need to increase energy of laser light for forming the irradiation mark 31 to be so high.

Note that the present embodiment is a mere example and does not limit the present disclosure in any way. Therefore, it should be understood that various improvements and alterations of the present disclosure are possible without departing from the spirit of the disclosure.

For example, the pattern of the irradiation mark 31 formed on the irradiation target surface 26 prior to the welding step is not limited to those illustrated in, e.g., FIG. 4. At a minimum, the pattern may be a pattern meeting the following two conditions. In other words, the two conditions are that: all of spots are not arranged on a straight line; and a representative position in the entire pattern can be calculated by any sort of arithmetic processing based on positions of the respective spots. In the case of a pattern in which all spots are arranged in a straight line, a representative position cannot properly be determined as a two-dimensional coordinate position, and thus, such pattern is not proper. Besides the orthogonal four-direction pattern illustrated in FIG. 4, a six-direction or eight-direction pattern, a T-shaped pattern or a three-direction pattern is conceivable.

Also, in the above embodiment, a beam splitting section that splits laser light from the laser oscillator 10 into a plurality of laser light beams, the diffraction optical element 17 is used. However, what can be used as the beam splitting section is not limited to the diffraction optical element 17. As the beam splitting section other than the diffraction optical element 17, for example, mechanically scanning a laser light irradiation position itself is conceivable. The mechanical scanning may be performed by operating the galvanometer mirror 24 of the X-Y scanner unit 21 or moving a workpiece 25 itself. Both may be used. However, it is undeniable that this method is inferior to the case where the diffraction optical element 17 is used, in terms of reproducibility of spot positions because of an error accompanying a mechanical scan.

Still another example of the beam splitting section can be a birefringent element. A birefringent element needs no mechanical movement other than advancement and retraction relative to the optical path of laser light and thus has a property similar to the diffraction optical element 17 in causing no aforementioned mechanical error. However, a pattern formed via a birefringent element does not necessarily naturally includes a spot at a position that is the same as that of direct laser light, and in such respect, a birefringent element is inferior to the diffraction optical element 17. Here, an optical element including both a diffraction optical element and a birefringent element may be used.

Furthermore, the embodiment described above is an embodiment of the present disclosure for welding using the laser welding apparatus 9. However, processing performed for an object by laser light from the laser oscillator 10 is not limited to welding. Examples of laser processing other than welding can include cutting and surface modification (if the object includes a surface coating layer, including removal of such layer). In those cases, a cut part or a modified part corresponds to a laser processed part. Also, in particular, in the case of surface modification, at the time of processing being performed, whether or not to use the diffraction optical element 17 (beam splitting section) can be selected.

What is claimed is:

1. A method for manufacturing a laser processed product including a laser processed part, the method comprising:

forming an irradiation mark including an irradiation pattern in a reference irradiation surface by using a laser oscillation section and a beam splitting section, the laser oscillation section emitting laser light for irradiation toward a processing object, the beam splitting section splitting the laser light from the laser oscillation section to form the irradiation pattern in an irradiation target surface of the processing object, the irradiation pattern including a plurality of irradiation spots not arranged in a straight line, the irradiation pattern including a representative position coinciding with a direct irradiation position for a case where the laser light from the laser oscillation section is provided without being split;

obtaining an image of the irradiation mark formed by using the laser oscillation section and the beam splitting section, via an imaging section, the imaging section obtaining the image of an area including a target position in the irradiation target surface;

determining the representative position in the irradiation pattern based on the positions of the plurality of irradiation spots in the image;

determining a deviation amount of deviation of the representative position from the target position in the image; and forming the laser processed part by irradiating the processing object with the laser light from the laser oscillation section with an irradiation position in the irradiation target surface corrected based on the deviation amount, the irradiation position being irradiated with the laser light from the laser oscillation section.

2. The method for manufacturing a laser processed product according to claim 1, wherein the direct irradiation position is included in the irradiation spots in the irradiation pattern.

3. The method for manufacturing a laser processed product according to claim 1, wherein for determining the representative position, a first representative line is determined based on two or more positions of the plurality of irradiation spots, and a second representative line that is not parallel to the first representative line is determined based on other two or more irradiation spots of the plurality of irradiation spots, and a position of intersection between the first representative line and the second representative line is determined as the representative position.

4. The method for manufacturing a laser processed product according to claim 1, wherein as the beam splitting section, a diffraction optical element that diffracts the laser light from the laser oscillation section is used.

5. The method for manufacturing a laser processed product according to claim 1, wherein as the reference irradiation surface, a surface of the processing object is used, the surface including a part to be processed.

6. The method for manufacturing a laser processed product according to claim 1, wherein the forming the irradiation mark is performed for a rough area within a range in which a surface roughness is determined in advance, in the reference irradiation surface.

7. The method for manufacturing a laser processed product according to claim 6, wherein the range is 0.2 μm to 0.25 μm.

8. The method for manufacturing a laser processed product according to claim 6, the method further comprising forming the rough area within the reference irradiation surface by roughening a surface of the processing object, before forming the irradiation mark.

9. The method for manufacturing a laser processed product according to claim 1, wherein the processing object includes a first outer covering member and a second outer covering member for a battery, and the laser processed product is a battery including the first outer covering member and the second outer covering member welded to each other via laser processing, the battery incorporating a power generation element inside.

* * * * *